United States Patent
Kawazoe et al.

(10) Patent No.: US 7,477,978 B2
(45) Date of Patent: Jan. 13, 2009

(54) RUMBLE STRIP RESPONSIVE SYSTEM: VEHICLE CONTROL ON RUMBLE STRIP

(75) Inventors: Hiroshi Kawazoe, Falls Church, VA (US); Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 656 days.

(21) Appl. No.: 11/094,323

(22) Filed: Mar. 31, 2005

(65) Prior Publication Data
US 2006/0224293 A1    Oct. 5, 2006

(51) Int. Cl.
G08B 23/00 (2006.01)
G06F 19/00 (2006.01)
(52) U.S. Cl. .............. 701/70; 701/1; 701/80; 702/147
(58) Field of Classification Search ............ 701/70, 701/73, 80, 90, 91, 1; 340/436, 933, 435, 340/425.5, 905, 575; 702/147, 47, 56; 180/272, 180/167
See application file for complete search history.

(56) References Cited

U.S. PATENT DOCUMENTS

| | | | |
|---|---|---|---|
| 4,701,069 A | 10/1987 | Whitney | |
| 5,582,490 A | 12/1996 | Murray | |
| 5,676,490 A | 10/1997 | Nelson | |
| 6,014,595 A | 1/2000 | Kobayashi | |
| 6,210,071 B1 | 4/2001 | McSharry | |
| 6,220,783 B1 | 4/2001 | Maxwell | |
| 6,259,374 B1 * | 7/2001 | Kisner et al. | 340/905 |
| 6,363,419 B1 | 3/2002 | Martin, Jr. et al. | |
| 6,454,490 B1 | 9/2002 | Murphy | |
| 7,034,698 B2 * | 4/2006 | Matsumoto et al. | 340/575 |

FOREIGN PATENT DOCUMENTS

WO    WO 01/71372 A2    9/2001

OTHER PUBLICATIONS

U.S. Appl. 11/094,322, filed Mar. 31, 2005, Kawazoe et al.
U.S. Appl. No. 10/811,148, filed Mar. 29, 2004, Kawazoe et al.
U.S. Appl. No. 10/811,149, filed Mar. 29, 2004, Kawazoe et al.

* cited by examiner

*Primary Examiner*—Tan Q Nguyen
(74) *Attorney, Agent, or Firm*—Foley & Lardner LLP

(57) ABSTRACT

A device adapted to automatically control the effective output of a vehicle control system/component that, for example, automatically applies braking and/or steering control, in response to tire contact with a rumble strip. The device includes a processor configured to receive a first signal indicative of contact of a vehicle tire with a rumble strip. The processor also includes logic to determine that at least one vehicle tire is in contact with a rumble strip based at least on the first signal. If the processor has received the first signal and has determined that the at least one vehicle tire is in contact with the rumble strip, the processor then issues a command to control the effective output of at least one of a vehicle control component or a vehicle control system. For example, an automatically applied braking force may be reduced to ½ its normal applied force.

34 Claims, 13 Drawing Sheets

RUMBLE STRIP RESPONSIVE SYSTEM: VEHICLE CONTROL ON RUMBLE STRIP

CROSS-REFERENCE TO RELATED PATENT APPLICATIONS

This patent specification is related to U.S. patent application Ser. Nos. 10/811,148 and 10/811,149, filed on Mar. 29, 2004, both to the present inventors and both entitled Rumble Strip Responsive Systems, the contents of which are incorporated herein in their entirety.

BACKGROUND OF THE INVENTION

Vehicle control systems and/or vehicle control components (e.g., such as those described in U.S. patent application Ser. Nos. 10/811,148 and 10/811,149 both to the present inventors, the contents of which are incorporated herein in their entirety) may be used to automatically control one or more vehicle dynamic features, such as braking, steering, etc., without driver input and/or with reduced driver input. For example, automatic braking upon determination that a vehicle is departing from a roadway and/or automatic steering when a determination has been made that the vehicle is improperly departing from a roadway might be implemented to avoid and/or reduce the effects of a collision. These automatic control systems/automatic control components may be beneficial in certain instances (herein, such instances will be referred to as the "normal state" of control operation). The present inventors have determined that in some instances, however, application of automatic control system(s) and/or automatic control component(s) should be tempered depending on certain vehicle environmental conditions.

SUMMARY OF THE INVENTION

In a first embodiment of the invention, there is a device adapted to automatically control the effective output of a vehicle control system/component in response to tire contact with a rumble strip that includes a processor adapted to receive at least a first signal indicative of contact of a first vehicle tire with a rumble strip, wherein the processor includes logic to determine that at least one vehicle tire is in contact with a rumble strip based at least on the first signal, and only if the processor has received the first signal and has determined that the at least one vehicle tire is in contact with the rumble strip, issue a command to control the effective output of at least one of a vehicle control component or a vehicle control system.

In another embodiment of the invention, the device disables a vehicle control component or a vehicle control system when vehicle contact with a rumble strip is determined.

In another embodiment of the invention, the device limits a vehicle control component or a vehicle control system when vehicle contact with a rumble strip is determined.

In another embodiment of the invention, the device enables a vehicle control component or a vehicle control system when a determination is made that the vehicle is departing from a roadway and that there is no current vehicle contact with a rumble strip.

In yet another embodiment of the invention, there is a device adapted to automatically control the effective output of a vehicle control system/component in response to tire contact with a rumble strip, comprising a processor adapted to receive at least a first signal indicative of at least one of (i) contact of a first vehicle tire with a rumble strip and (ii) absence of contact of the first vehicle tire with a rumble strip, wherein the processor includes logic to, determine that no vehicle tire is in contact with a rumble strip based at least on one of (i) the first signal and (ii) an absence of the first signal, and only if the processor has determined that no vehicle tire is in contact with the rumble strip, issue a command to enable at least one of a vehicle control component or a vehicle control system.

DETAILED DESCRIPTION OF THE PREFERRED EMBODIMENTS

Figure 1:
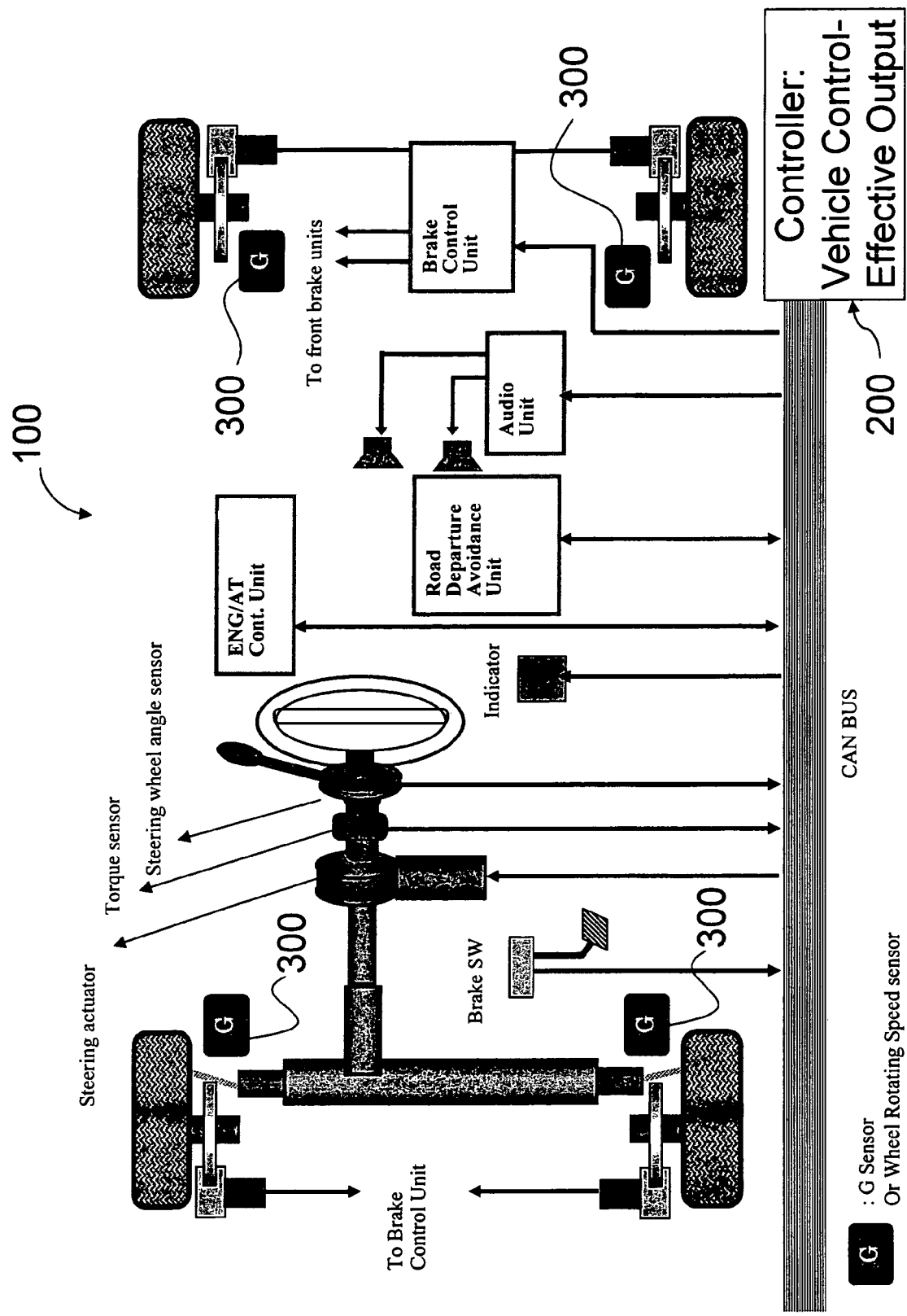
FIG. 1 presents a schematic of an embodiment according to the present invention.

A first embodiment of the present invention, as presented in FIG. 1, relates to a device 100 including a controller 200 that is adapted to control the effective output of a vehicle control component and/or a vehicle control system when the device determines that a vehicle tire is in contact with a rumble strip. According to a first embodiment of the invention, the controller 200 receives input through a CAN BUS from sensors 300 indicative of contact of one or more vehicle tires with a rumble strip (e.g., a sensor as detailed in U.S. patent application Ser. Nos. 10/811,148 and 10/811,149 both to the present inventors, and/or or a sensor that detects the rotational speed of one or more vehicle tires—an exemplary system of detecting rumble strips using such phenomenon being detailed in U.S. patent application Ser. No. 11/094,322, entitled Rumble Strip Responsive Systems: Discrimination of Types of Rumble Strips, again to the present inventors, filed on the same day as this application, the contents of which are incorporated herein by reference in their entirety.) Such an embodiment addresses the fact that the coefficient of friction associated with a vehicle tire in contact with rumble strips may be substantially different than that of a tire not in contact with a rumble strip. By coefficient of friction, it is meant the phenomenon that allows for traction/force conveyance between a vehicle tire and a road surface, the absence of sufficient coefficient of friction resulting in tire spin/skid that may frustrate vehicle control in an undesirable way. Thus, according to this embodiment, by controlling the effective output of a vehicle control component and/or a vehicle control system, the phenomenon of differing coefficients of friction for different tires may be accounted for and/or undesired effects of such a phenomenon may be mitigated. An exemplary scenario utilizing this embodiment will first be described, followed by specific details of some specific embodiments.

Before describing the exemplary scenario, it is noted that FIG. 1 further presents a vehicle 100 equipped with various components utilized in collision control/avoidance/warning systems, as well as lane departure control/avoidance/warning systems (e.g., steering control/assist, brake control/assist, etc.) Some embodiments of the invention utilize some or all of these components in combination with a device to determine the type of rumble strip in contact with vehicle tire(s). However, it is noted that some or all of these other components are not necessary to practice other embodiments of the present invention.

Figure 2:
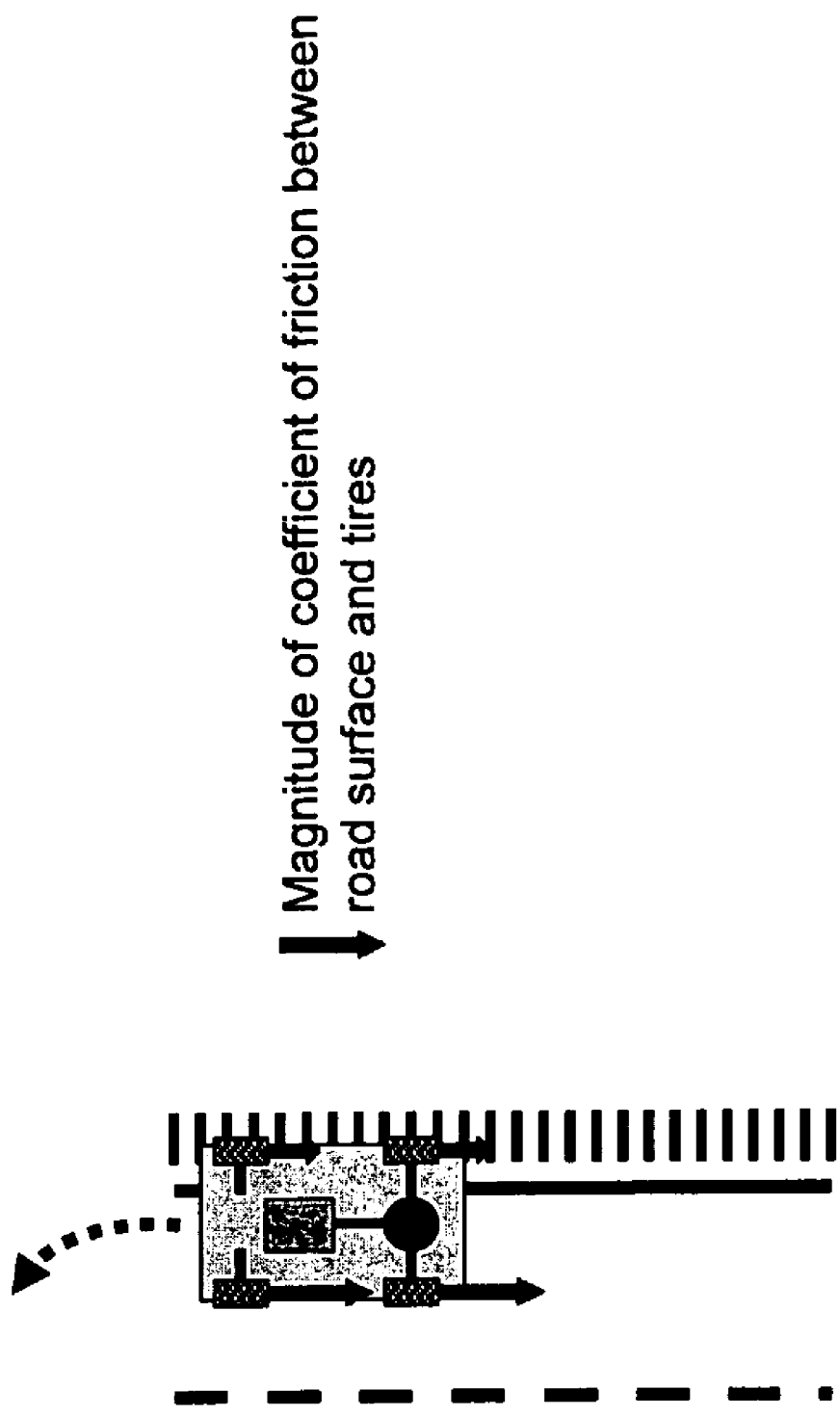
FIG. 2. presents a graphical representation of vehicle tire contact with a rumble strip.

In an exemplary scenario, a vehicle is driving down a roadway lined with rumble strips on the right side of the road, as shown in FIG. 2. FIG. 2 shows an exemplary road utilizing rumble strips with respect to a vehicle driving on the rumble strip, where the rumble strip is a right side rumble strip and the vehicle is deviating from the lane/road towards the right (with respect to direction of travel of the vehicle). For one reason or another, the vehicle deviates from the lane/road and thus the vehicle tire(s) on one side of the vehicle encounter the rumble strip (e.g., the front right tire and/or the rear right tire, as shown in FIG. 2). However, one or more of the other vehicle tire(s) is/are not in contact with the rumble strip (e.g., the front left tire and/or the rear left tire, in the event of right side (road) rumble strip location and deviation from a lane to the right). In this scenario, due to the fact that one or more vehicle tires is in contact with the rumble strips and one or more vehicle tires is not in contact with the rumble strips (i.e., in contact with a normal road surface), the respective coefficient of friction between these tires and the road will be different. In most exemplary scenarios, the coefficient of friction between the tire and rumble strip will be lower as compared to the coefficient of friction between the tire and the normal road surface. In such a scenario, were the driver and/or the control system to apply, for example, brake control and/or steering control, the resulting effect of that brake control and/or steering control would be different between the two wheels. For example, when applying brake control, the vehicle tire(s) not in contact with the rumble strip would import a greater braking force onto the vehicle than the vehicle tire(s) in contact with the rumble strip. This could impart a limited yaw effect on the vehicle, which, in some circumstances, may be undesirable. For example, in the scenario just described, where the right side tire(s) is/are in contact with the rumble strip and the left side tire(s) is/are not in contact with the rumble strip, upon application of a braking force, a yaw moment may be imparted onto the vehicle to the left. Alternatively, in some scenarios, in the event that the vehicle has deviated from the lane such that the left side tire(s) is/are in contact with the rumble strip and the right side tire(s) is/are not in contact with the rumble strip, a right turning yaw might be induced to the vehicle, thus possibly further exaggerating road departure. (This latter scenario is discussed in greater detail below.)

Accordingly, a first embodiment of the present invention addresses the above described scenario. In a first embodiment of the present invention, there is a device installed on a vehicle that is adapted to control the effective output of at least one of a vehicle control system and/or a vehicle control component, such as element 200 in FIG. 1. By effective output, it is meant the end result of implementation/absence of implementation of a vehicle control component/system as such implementation/absence of implementation affects the dynamics of the vehicle.

In a first embodiment of the present invention, this device includes a processor that is adapted to receive input, by way of example, carried on a first signal, that is indicative of contact of a vehicle tire with a rumble strip. Such input may be received from a signal generated from a rumble strip sensor utilizing a vibration sensing mechanism. In other embodiments of the invention, the processor could receive input carried on a signal from one or more of the devices, systems and methods disclosed in U.S. patent application Ser. Nos. 10/811,148 and 10/811,149 to the present inventors, filed on Mar. 29, 2004, the contents of which are incorporated herein by reference in their entirety.

The processor also includes logic that may permit the processor to determine that one or more of the vehicle tire(s) is/are in current contact with a rumble strip, based on the received input carried by the first signal. The processor further includes logic such that upon this determination, the processor may issue a command to control the effective output of a vehicle control system/vehicle control component. Thus, in a vehicle utilizing an embodiment of the first invention, in a scenario described above, the device may disable a control system and/or a control device that has previously been activated (i.e., operating in the normal state) when at least one vehicle tire is in contact with the rumble strip. By way of example, if the vehicle control system/component results in automatic braking, the automatic braking feature may be disabled while the vehicle tire is in contact with the rumble strip. Such may be done by deactivating the automatic braking control system/component, intercepting a signal from the automatic braking control system/component to prevent implementation of automatic braking, disconnecting the automatic braking control system/component, etc.

The just described embodiment disables the vehicle control system/control component upon determination that a vehicle tire is in contact with the rumble strip. However, in other embodiments, the effective output of the vehicle control system/component may be changed from the normal state while a vehicle tire is in contact with a rumble strip, as opposed to disabling the entire system. By way of example, a braking force applied by an automatic control system/component may be limited by reducing the force to, for example, one-half its "normal" state while the vehicle is in contact with the rumble strip. Other embodiments of the present invention may vary this by two-thirds, one-quarter, etc., or by any other amount necessary to achieve the desired amount of control of the effective output. Still further, other embodiments may utilize a time delay to implement braking force, pulsation of the braking force, and/or real-time adjustment of the braking force, where the effective output of a braking force from a vehicle control system is, for example, initially set at 100% of its normal braking force and then gradually decreases to perhaps 10% or even 0 in the event that a determination is made that the braking force is not achieving desired results. In other embodiments of the invention, change/limitation of the effective output may be achieved by limiting/reducing the gain of a signal in/from the vehicle control system/vehicle control component that is determinative of an effective output of the system/component.

In another embodiment of the present invention, instead of disabling or limiting the effective results of a vehicle control system, there is a device that first determines whether a tire of a vehicle is in contact with a rumble strip, and then, upon determination that a vehicle tire is not in contact with a rumble strip, implements the vehicle control system/vehicle component control when such activation is warranted. That is, in this embodiment of the present invention, upon a determination that all four wheels are on a "normal" road surface (i.e., not on a rumble strip), and that the vehicle is in a situation where a vehicle control system/vehicle control component should otherwise be activated, the vehicle control system/vehicle control component is activated. Thus, an embodiment of the present invention may be configured such that even though a condition may warrant activation of a vehicle control system to obtain the effective output, such activation will not occur if the device determines that one or more vehicle tires is in contact with a rumble strip.

In another embodiment of the invention, the device shuts down an already enabled vehicle control system upon a determination that vehicle tires are in contact with a rumble strip.

Figure 3:
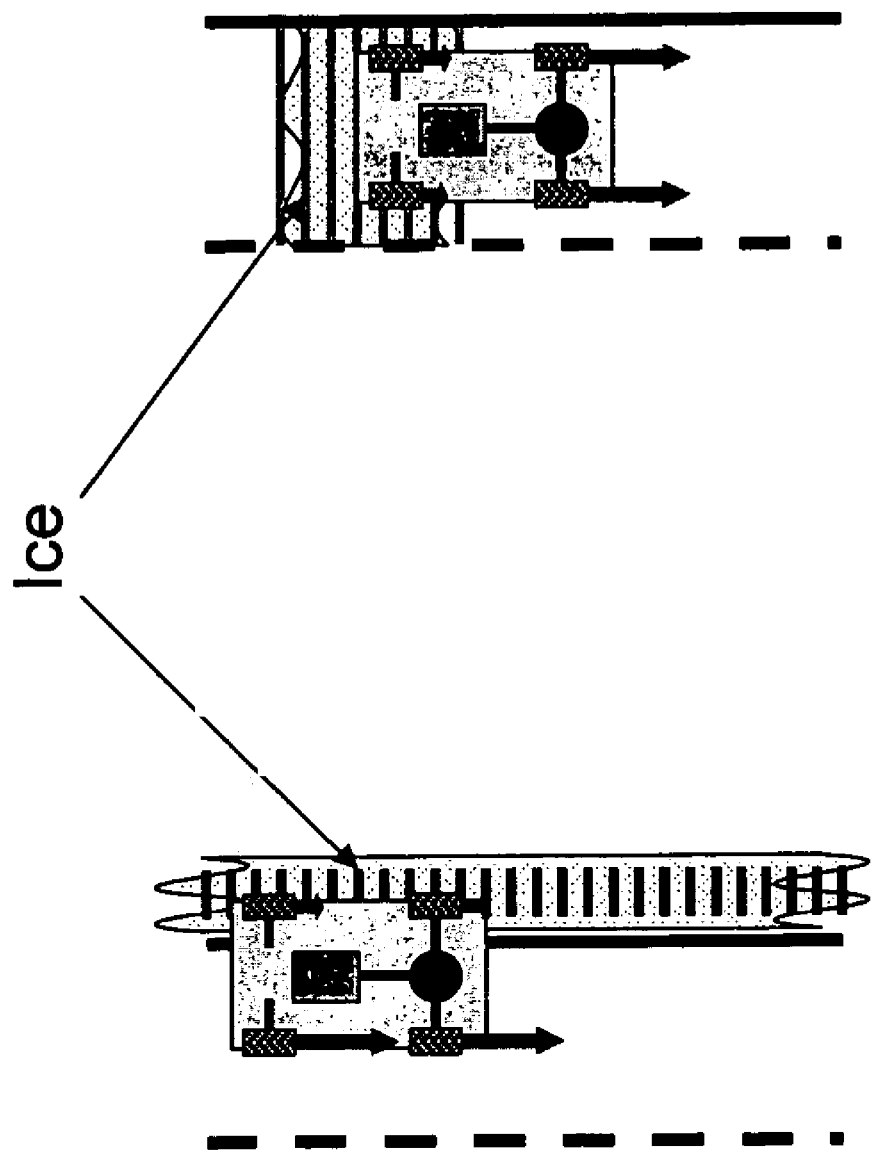
FIG. 3. presents graphical representations of vehicle tire contact with ice-filled rumble strip grooves.

In another embodiment of the present invention, the command that controls the effective output of the vehicle control component/vehicle control system is based on a determination of whether the outside temperature is a freezing temperature. In an exemplary scenario as depicted in FIG. 3, when an outside temperature drops below freezing, water located in the groves of a rumble strip could freeze, and thus form pockets of ice on the roadway. In such an scenario, the coefficient of friction between the vehicle tires and the road is drastically reduced owning to the presence of the ice in the grooves of the rumble stripes. In fact, the ice may become the major driver for this drastic reduction in coefficient of friction. Thus, an embodiment of the invention include a device that determines whether to control the effective output of a vehicle control system/vehicle control component based on whether or not the outside temperature is at or below freezing. In such an embodiment, a control system may be activated or otherwise permitted to perform in the "normal state" when there is a determination that one or more of the vehicle tires is in contact with a rumble strip, if the outside temperature is not a freezing temperature. However, in the event that the outside temperature does drop below freezing, this embodiment would control the effective output of the vehicle control component/vehicle control system as described above. For example, in some embodiments, the vehicle control system may be disabled while in other embodiments the output may be limited, etc.

In still other embodiments, activation of a vehicle control system/vehicle control component will be determined based on whether the temperature is a freezing temperature. Thus, if the outside temperature is below freezing and the determination is made that the vehicle is running on rumble strips, the control system will not be activated. However, if the determination is made that the vehicle is running on rumble strips but the outside temperature is not below freezing (i.e., is above freezing), the vehicle control system will be activated.

In yet other embodiments, effective output of the vehicle control system/components varies based on whether the outside temperature is a freezing temperature. For example, if the vehicle is running on a rumble strip and the outside temperature is above a freezing temperature, the effective output will be reduced by a first amount (e.g., braking force could be reduced by ½), and if the vehicle is running on a rumble strip and the outside temperature is a freezing temperature the effective output will be reduced by a second amount (e.g., braking force could be reduced by ¾) that is different from the first amount.

It is noted at this point that while may of the embodiments described herein relate to line rumble strips (rumble strips on the shoulder of a road, center-road rumble strips, etc.), the temperature-dependent embodiment may also be used for in-lane rumble strips (rumble strips that extend across a lane, such as, for example, those in a road that may be encountered as a vehicle approaches a toll center). Thus, in the embodiment just described, where the command is issued based in further part on temperature based on outside temperature, the vehicle control component/vehicle control system could be disabled or enabled or the effective output of the vehicle control component/vehicle control system could be controlled to address instances where the vehicle is on in-lane rumble strips. That is, in the embodiment which is sensitive to the outside temperature, the effective output of a vehicle control component/vehicle control system may be controlled when both the left and right tires are on rumble strips.

Figure 4:
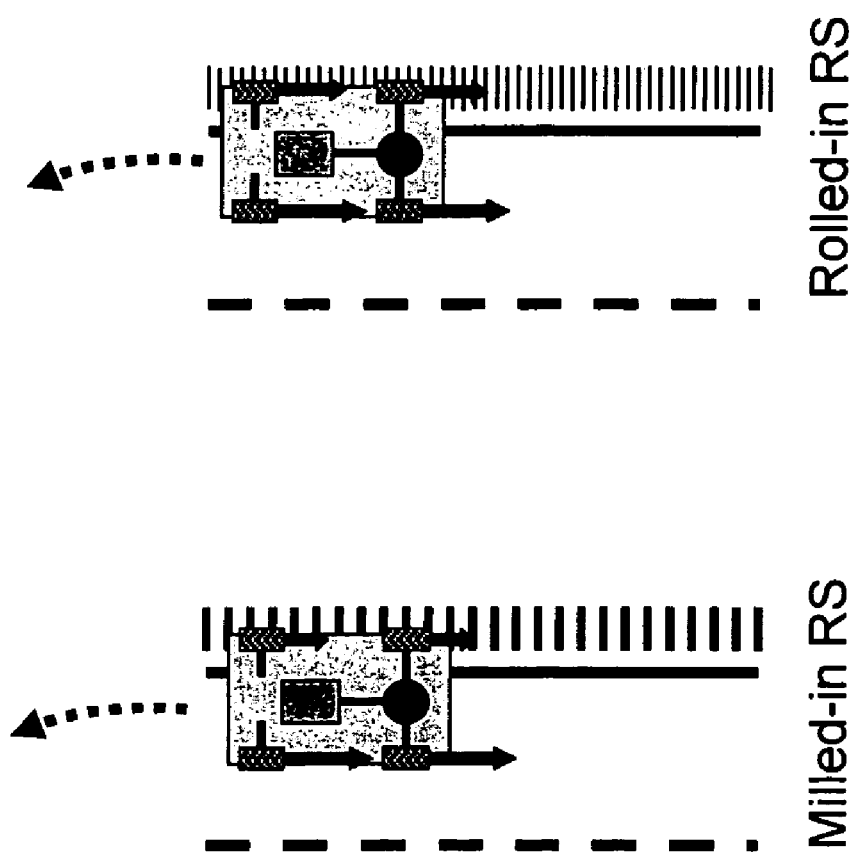
FIG. 4. presents graphical representations of vehicle tire contact with a milled-in rumble strip and a rolled-in rumble strip.

Another embodiment of the present invention addresses control of the effective output of vehicle control components/ system in view of different types of rumble strips encountered on a road. For example, some rumble strips are milled-in rumble strips and others are rolled-in rumble strips, as may be seen in FIG. 4. Milled-in rumble strips typically have wider grooves (with respect to road direction), while rolled-in rumble strips typically have grooves that are spaced closer together and are narrower than the milled-in rumble strips. The coefficient of friction between the tire and a milled-in rumble strip will be different than a coefficient of friction between a tire and a rolled-in rumble strip. Accordingly, embodiment of the present invention determines the type of rumble strip and controls the effective output of the control device/system based on this determination. Thus in one embodiment of the present invention, there is a device that includes a processor adapted to receive an input that is indicative of a type of rumble strip that is contact with the vehicle tire. This processor may include logic to analyze the input and issue the command to effectively control the system/component based on the type of rumble strip in contact with the tire. For example, the logic may determine (e.g., by frequency analysis and/or by amplitude analysis) that the input is indicative of a rolled-in rumble strip and differentiate between a rolled-in rumble strip and a milled-in rumble strip.

Other embodiments may simply utilize logic that determines that the input is not indicative of a given type of rumble strip and/or the logic ignores all other types of input that are not indicative of a given rumble strip. Thus, this embodiment of the invention may be practiced with any device, system or method that will permit differentiation between at least two types of rumble strips and/or identification of at least one type of rumble strip, and use this determination/identification to determine whether to issue a command or determine what command shall be issued to control the effective output of a vehicle control component/vehicle control system. By way of exemplary embodiment, if the device determines that the vehicle is running on milled-in rumble strips, the issued command could disable the vehicle control device and/or the vehicle control system, whereas if a determination is made that the vehicle is running on rolled-in rumble strips, no disablement of the vehicle control component or the vehicle control system will be made. Alternatively by way of exemplary embodiment, if the device determines that the vehicle is running on milled-in rumble strips, the issued command could reduce the effective output of the vehicle control device and/or the vehicle control system by, for example, ½, whereas if a determination is made that the vehicle is running on rolled-in rumble strips, the issued command could reduce the effective output of the vehicle control device and/or the vehicle control system by, for example, ¼.

Figure 5:
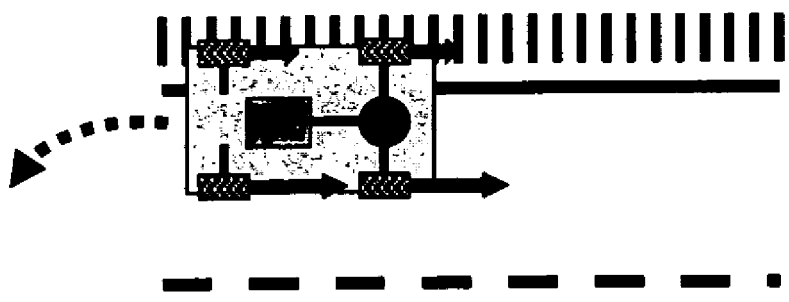
FIG. 5. presents a graphical representation of right side vehicle tire contact with right side rumble strips, where the control system imparts a yaw on the vehicle tending to direct the vehicle back onto the road.
Figure 6:
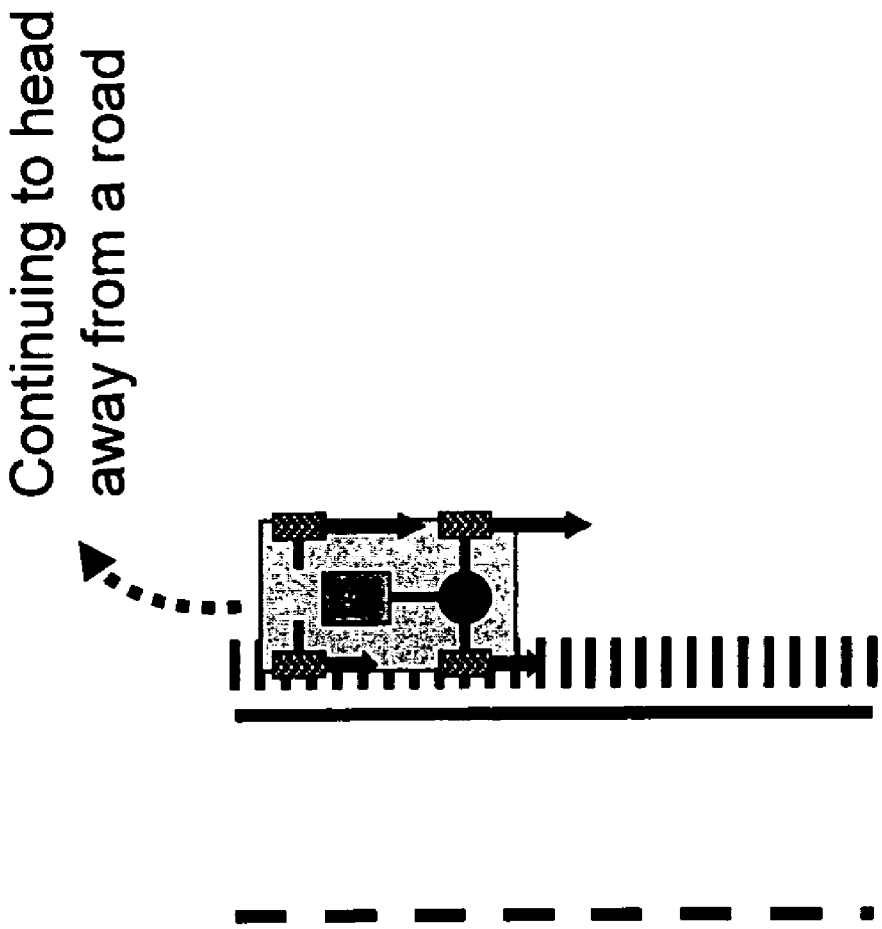
FIG. 6. presents a graphical representation of left side vehicle tire contact with right side rumble strips, where the control system, if implemented, may impart a yaw on the vehicle tending to direct the vehicle further off the road.

Yet another embodiment of the present invention relates to determining a state of road departure of a vehicle and, from that determination, determining whether to issue the command to control the effective output of the vehicle control system/vehicle control component. By way of exemplary scenario as presented in FIGS. 5 and 6, if a vehicle begins to depart from a road on which a rumble strip is located on the right side of the road, the right side vehicle tires will first contact the rumble strip (see FIG. 5). In such a scenario, the coefficient of friction between the road and the tires on the right side of the vehicle will be lower than that of the tires on the left side of the vehicle. Thus, any applied braking force to the vehicle will be lower on the right side than on the left side. In such an exemplary scenario, if, for example, braking control is applied the vehicle, a yaw will be imparted to the left because the left side tires will impart a greater braking force than the right side tires. This will have the beneficial result of imparting a yaw that will direct the vehicle back towards the roadway. (An embodiment of the invention that addresses this example is detailed below.) However, if the vehicle continues to deviate from the road such that the left side vehicle tires come into contact with the rumble strips but the right side vehicle tires still remain on the road surface (i.e., the shoulder of the road), as is shown at FIG. 6, if braking control is applied, a yaw will be imparted on the vehicle to the right, thus further exaggerating a road departure situation. Therefore, an embodiment of the present invention addresses at least the latter scenario by determining if vehicle tires are in continued contact with a rumble strip and determining whether the vehicle is in a state of continued road departure. If there is continued contact between a tire and a rumble strip and it is also determined that the vehicle is continuing to depart from the road, a device will issue a command to control the effective output of a vehicle control component or vehicle control system.

Still further, another embodiment of the present invention that addresses the road departure scenarios described in the above paragraph includes a device having a processor that is adapted to receive a first input indicative of a side of the vehicle on which the tire in contact with the rumble strip is located, and receive a second input indicative of the state of the vehicle with respect to road departure and a direction of road departure. For example, in the scenario depicted in FIG. 5, the processor would receive signals and determine that the right side tires are in contact with the rumble strip and that the vehicle is in a state of departure such that the vehicle is departing from the road towards the right. The device according to this embodiment may further determine whether the vehicle is in a continued state of road departure. The device so enabled will include logic to determine from the received signals whether the direction of road departure is opposite to the side of the vehicle on which the vehicle tire in continued contact with the rumble strip is located, such as in the exemplary scenario of FIG. 6. If such is the case, the device according to this exemplary embodiment would not issue a command to control the effective output of a vehicle control component/vehicle control system to avoid undesirable vehicle yaw. However, in regard to the scenario of FIG. 5, where the direction of road departure is on the same side of the vehicle as that of the vehicle tire(s) in continued contact with the rumble strip, in a device so enabled, no determination would be made that the direction of road departure is opposite to the side of the vehicle on which the vehicle tire in continued contact with the rumble strip is located (because the pertinent signals would not be received), and, since application of an automatic braking force should impart beneficial yaw to the vehicle, no command to disable or limit the vehicle control component/vehicle control system would be issued and/or the component/system may be activated.

In another embodiment of the invention, if the vehicle is in a state of continued road departure, and, with respect to a lateral direction of the vehicle, if the direction of road departure is opposite the side of the vehicle on which the vehicle tire in continued contact with the rumble strip is located, the device issues a command to change a ratio of right to left automatic brake application. In this embodiment, the ratio of right to left automatic brake application is greater than one if the side of the vehicle on which the vehicle tire in continued contact with the rumble strip is located is the right side, and the ratio of right to left automatic brake application is less than one if the side of the vehicle on which the vehicle tire in continued contact with the rumble strip is located, is the left side.

It will be noted that the term "contact" as used herein refers to the scenario where the tires are in actual contact with a rumble strip. Such may be determined, by way of example, thought a rumble strip detection system that utilizes a sprung mass sensor, etc., to detect vibration of a vehicle due to contact with a rumble strip. However, other embodiments of the present invention may utilize a rumble strip detection system such that imminent rumble strip contact may be detected. That is, prior to contact of the tire with the rumble strip, the system may identify the rumble strip and consider the rumble strip to be "contacted," even though actual physical contact is not actually present. Such a system may utilize an image recognition system and/or a laser system etc., coupled with a processor, to detect the rumble strip and calculate or otherwise determine a likelihood of rumble strip contact within a given period of time, and if that likelihood achieves a predetermined limit, consider the rumble strip contacted. Accordingly, an embodiment of the present invention may utilize a device that determines or estimates imminent contact between a tire and a rumble strip before the tire actually contacts the rumble strip. Thus, by "contact" with a rumble strip, it is also meant expected/anticipated imminent contact. Thus, embodiments of the present invention are not restricted to utilizing systems that only determine actual contact with a rumble strip. Some embodiments therefore also include devices that predict contact with a rumble strip and assume that contact has been made with the rumble strip/prepare for expected contact with the rumble strip.

To implement some or all of the embodiments described above, some embodiments of the device according to the present invention may be directly intertwined/interconnected with the vehicle control system such that the vehicle control system includes the device according to the present invention. In other embodiments of the present invention, the device functions as a supervisory device such that it may enable/disable/shutdown/limit, etc., the effective output of the vehicle control system/device from outside the system/device. It is noted that in both such situations, the device may function to limit a control of the effective results of the control system/control device.

Figure 7:
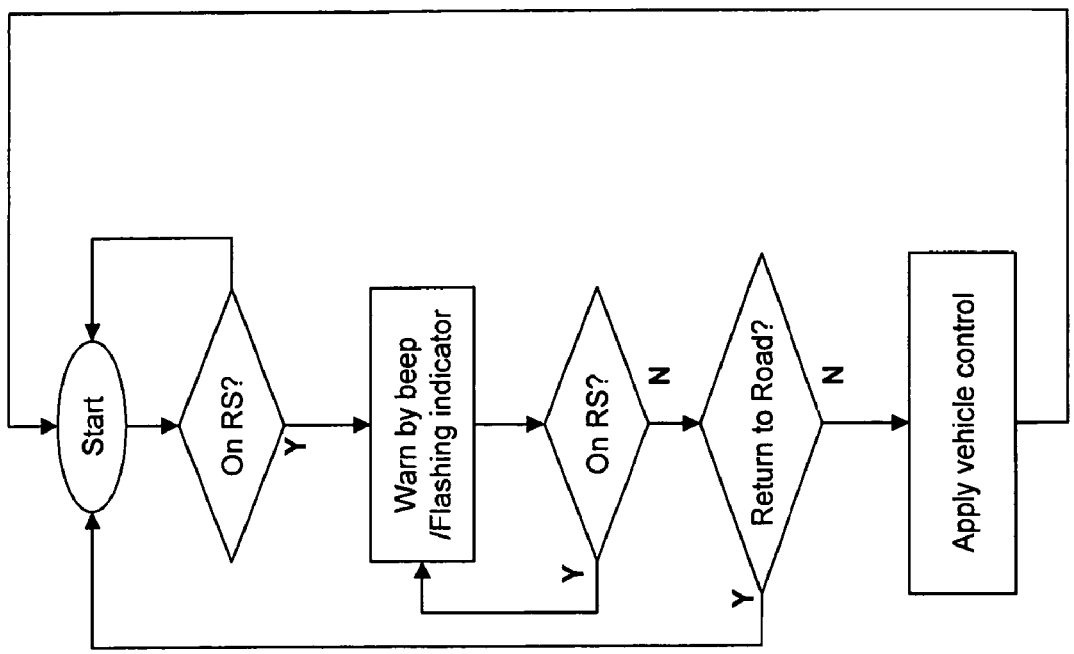
FIG. 7 presents a flow chart for an algorithm to implement an embodiment of the present invention, where vehicle control is implemented only if a determination is made that the vehicle is not on rumble strips.
Figure 8:
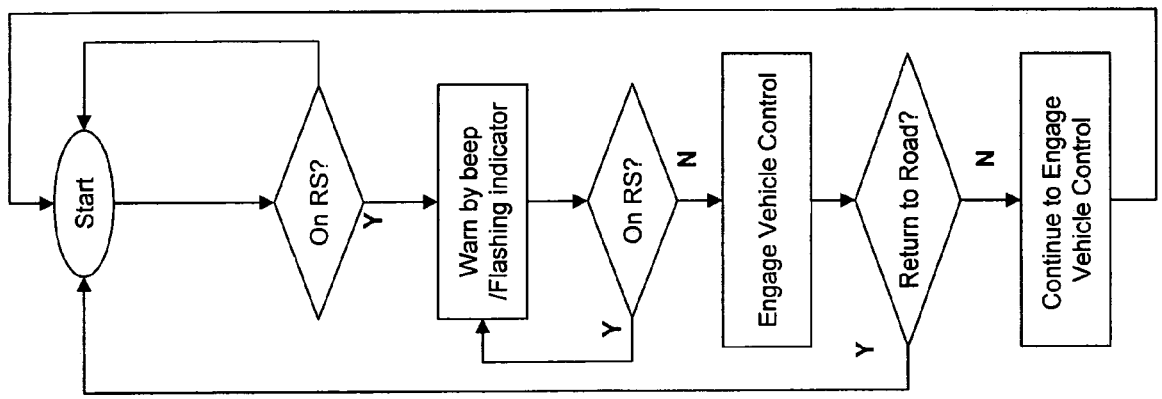
FIG. 8 presents a flow chart for an algorithm to implement another embodiment of the present invention, where vehicle control is implemented only if a determination is made that the vehicle is not on rumble strips.
Figure 9:
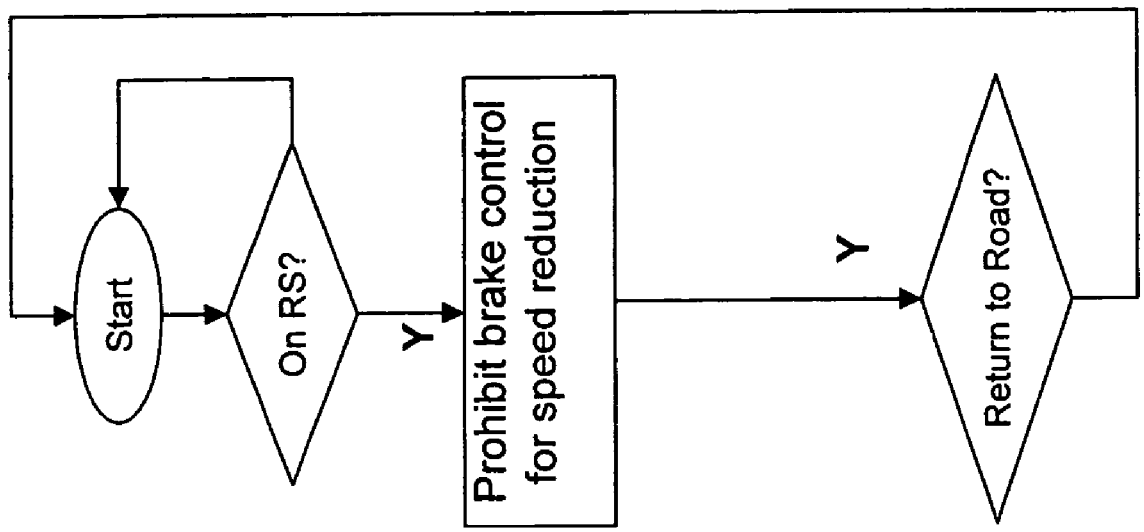
FIG. 9 presents a flow chart for an algorithm to implement another embodiment of the present invention, where brake control for speed reduction is prohibited if a determination is made that the vehicle is on rumble strips.
Figure 10:
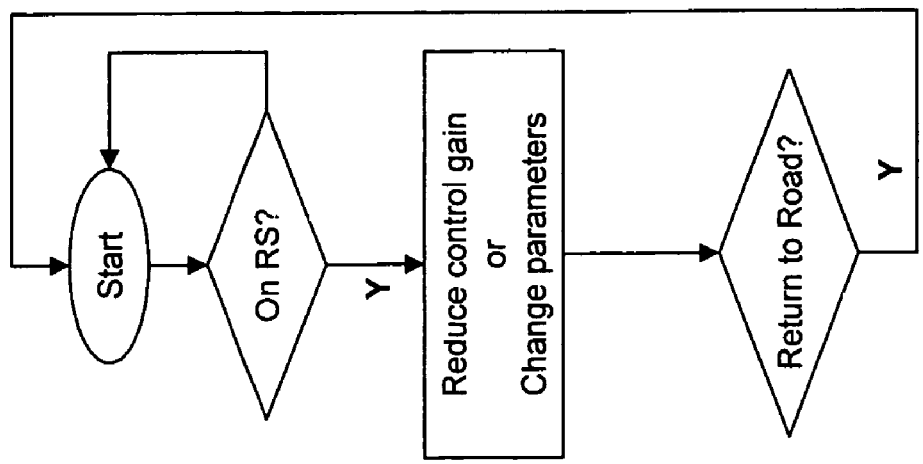
FIG. 10 presents a flow chart for an algorithm to implement another embodiment of the present invention, where control gain is reduced/control parameters are changed if a determination is made that the vehicle is on rumble strips.
Figure 11:
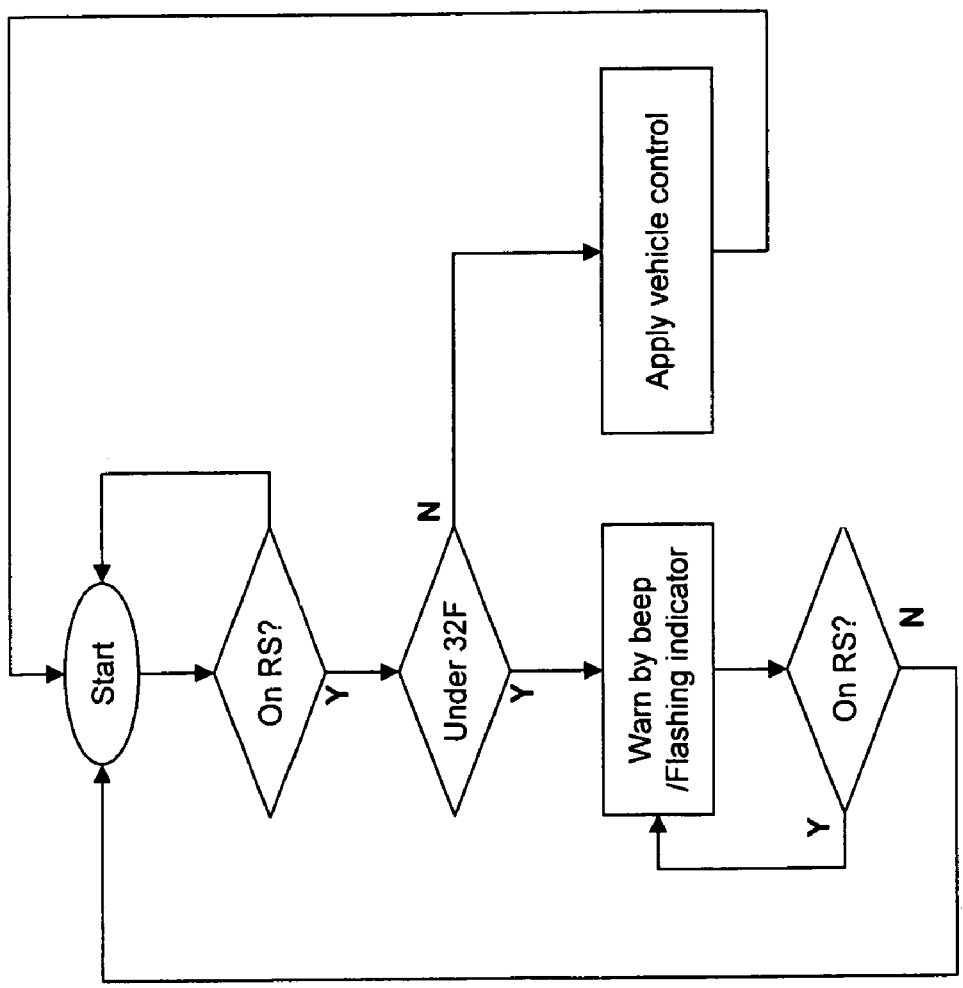
FIG. 11 presents a flow chart for an algorithm to implement another embodiment of the present invention, where vehicle control is implemented if an outside temperature is above freezing and the vehicle is running on rumble strips.
Figure 12:
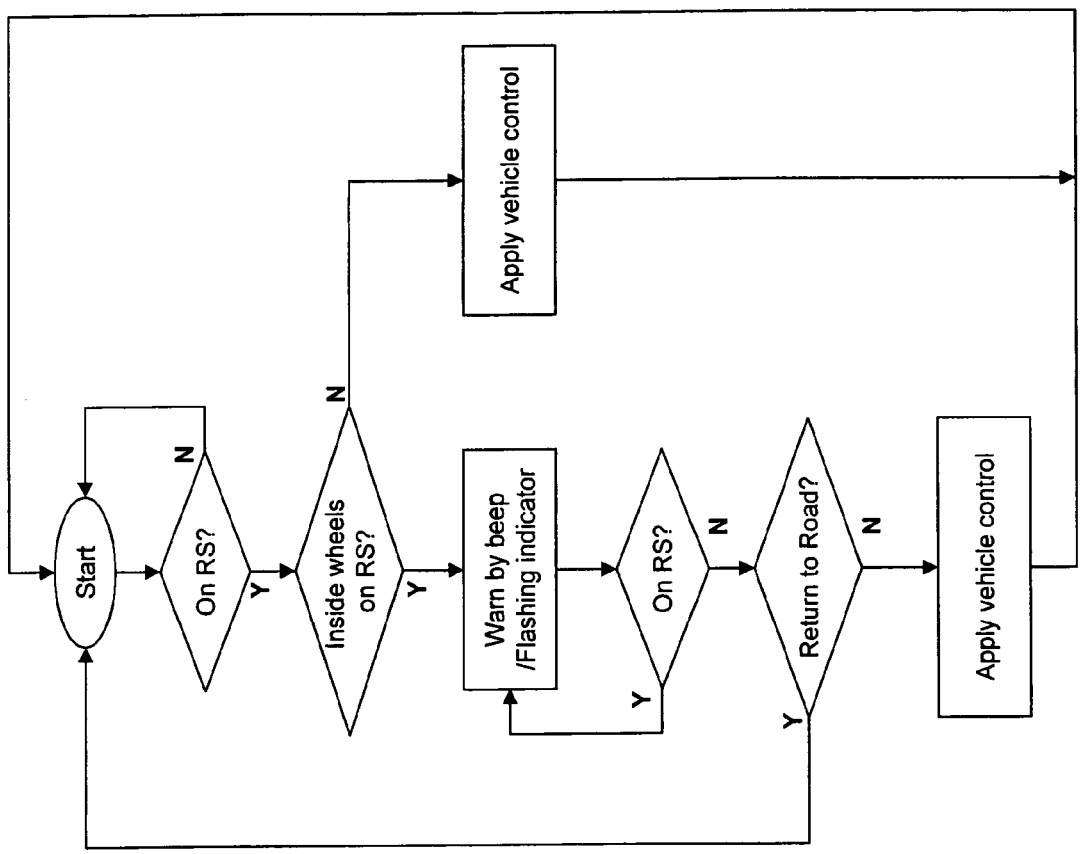
FIG. 12 presents a flow chart for an algorithm to implement another embodiment of the present invention.
Figure 13:
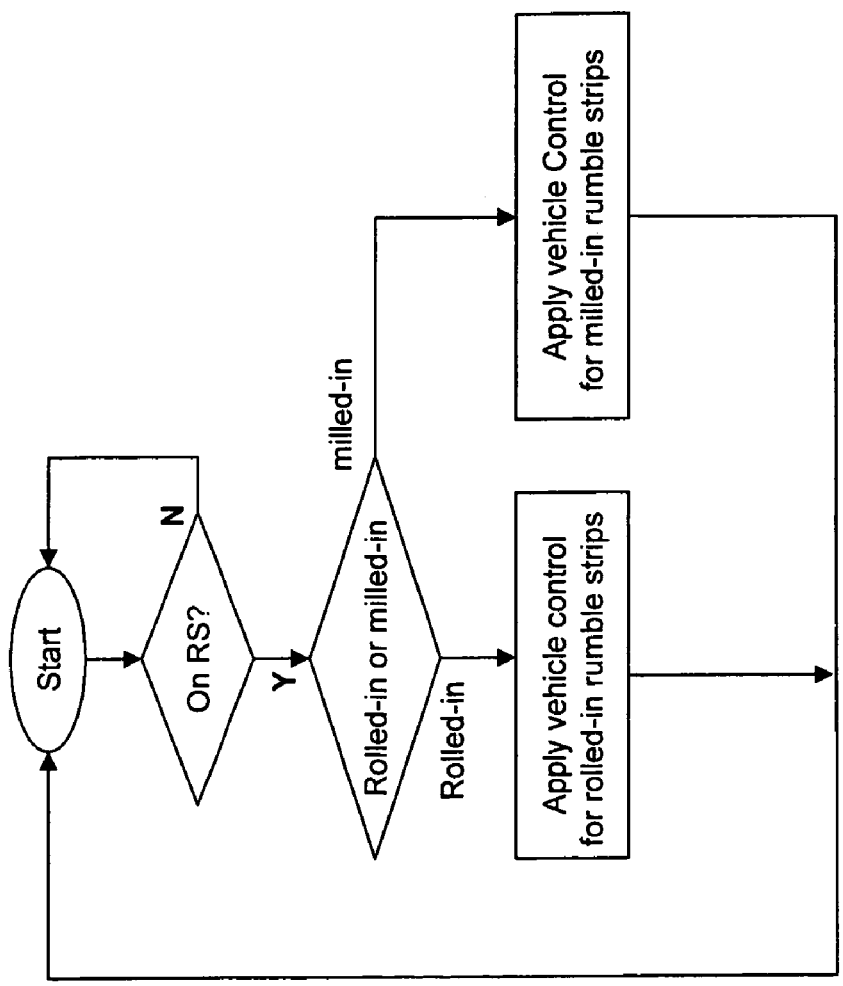
FIG. 13 presents a flow chart for an algorithm to implement another embodiment of the present invention, where vehicle control is implemented in a variable manner based on the type of rumble strips in contact with the vehicle.

FIGS. 7-13 illustrate specific implementations of the invention. One of skill in the art will understand that these figures provided some examples of the techniques described in detail above. Because such techniques have been described in detail above and/or may readily be implemented by one of ordinary skill in the art based on the figures in combination with the teachings and knowledge in the art, a detailed description of these figures is not provided. FIG. 7 presents a flow chart for an algorithm to implement an embodiment of the present invention, where vehicle control is implemented only if a determination is made that the vehicle is not on rumble strips. FIG. 8 presents a flow chart for an algorithm to implement another embodiment of the present invention, where vehicle control is implemented only if a determination is made that the vehicle is not on rumble strips. FIG. 9 presents a flow chart for an algorithm to implement another embodiment of the present invention, where brake control for speed reduction is prohibited if a determination is made that the vehicle is on rumble strips. FIG. 10 presents a flow chart for an algorithm to implement another embodiment of the present invention, where control gain is reduced/control parameters are changed if a determination is made that the vehicle is on rumble strips. FIG. 11 presents a flow chart for an algorithm to implement another embodiment of the present invention, where vehicle control is implemented if an outside temperature is above freezing and the vehicle is running on rumble strips. FIG. 12 presents a flow chart for an algorithm to implement another embodiment of the present invention. FIG. 13 presents a flow chart for an algorithm to implement another embodiment of the present invention, where vehicle control is implemented in a variable manner based on the type of rumble strips in contact with the vehicle.

The present invention includes methods of practicing the invention, software to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term "vehicle" as used herein encompasses cars, trucks, SUVs, minivans, and all other types of land vehicles operating on public roads.

It is noted that the term "processor," as used herein, encompasses both simple circuits and complex circuits, as well as computer processors. It is also noted that the term "logic," as used herein, encompasses both hardware, firmware, and software to implement logic.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A device adapted to automatically control the effective output of a vehicle control system/component in response to tire contact with a rumble strip, comprising:

a processor adapted to receive at least a first signal indicative of contact of a first vehicle tire with a rumble strip, wherein the processor includes logic to:
determine that at least one vehicle tire is in contact with a rumble strip based at least on the first signal; and
only if the processor has received the first signal and has determined that the at least one vehicle tire is in contact with the rumble strip, issue a command to control the effective output of at least one of a vehicle control component or a vehicle control system to take into consideration influence of a reduced coefficient of friction due to tire contact with the rumble strip.

2. The device of claim 1, wherein the command is issued after at least one of the respective vehicle control component or the vehicle control system has been engaged.

3. The device of claim 1, wherein the command is issued before at least one of the respective vehicle control component or the vehicle control system has been engaged.

4. The device of claim 1, further comprising a rumble strip sensor adapted to sense input from a rumble strip into the first vehicle tire and output the first signal indicative of contact between the first vehicle tire and the rumble strip.

5. The device of claim 1, wherein the command disables at least one of the vehicle control component or the vehicle control system.

6. The device of claim 5, wherein at least one of the vehicle control component or the vehicle control system includes at least one of a brake control and a steering control.

7. The device of claim 1, wherein the processor is adapted to receive an input indicative of a type of rumble strip in contact with the first vehicle tire, and wherein the processor further includes logic to analyze the first signal and further issue the command based on the type of rumble strip in contact with the first vehicle tire, and wherein at least one of (i) the first signal carries the input and (ii) a second signal carries the input.

8. The device of claim 7, wherein at least one of the first signal carries the input and a second signal carries at least a portion of the input.

9. The device of claim 1, wherein the processor is adapted to receive an input indicative of a type of rumble strip in contact with the first vehicle tire, and wherein the processor further includes logic to analyze the first signal and further issue the command based on the type of rumble strip in contact with the first vehicle tire, and wherein the logic to analyze the first signal and issue the command based on the type of rumble strip in contact with the first vehicle tire includes logic to:

determine that the input is indicative of a first type of rumble strip as opposed to at least a second type of rumble strip, and only if a determination is made that the input is indicative of the first type of rumble strip, issue the command, wherein the command controls the effective output of at least one of the vehicle control component or the vehicle control system in a first predetermined manner; and determine that the input is indicative of a second type of rumble strip as opposed to at least the first type of rumble strip, and only if a determination is made that the input is indicative of the second type of rumble strip, issue the command, wherein the command controls the effective output of at least one of the vehicle control component or the vehicle control system in a second predetermined manner, wherein the second predetermined manner is different than the first predetermined manner.

10. The device of claim 1, wherein the processor is adapted to receive an input indicative of a type of rumble strip in contact with the first vehicle tire, and wherein the processor further includes logic to analyze the first signal and further issue the command based on the type of rumble strip in contact with the first vehicle tire, and wherein the logic to analyze the first signal and further determine whether to issue the command based on the type of rumble strip in contact with the first vehicle tire includes:
  logic to analyze the input and determine that the input is indicative of a first type of rumble strip as opposed to at least a second type of rumble strip; and
  issue the command only if a determination is made that the input is indicative of the first type of rumble strip as opposed to at least a second type of rumble strip.

11. The device of claim 1, wherein the command partially limits the effective output of at least one of the vehicle control component or the vehicle control system.

12. The device of claim 11, wherein at least one of the vehicle control component or the vehicle control system includes at least one of a brake control and a steering control.

13. The device of claim 11, wherein the processor is further adapted to receive a second signal indicative of at least one of an outside temperature that is freezing and a value of an outside temperature, wherein the processor further includes logic to:
  analyze the second signal and determine whether the outside temperature is a freezing temperature; and
  only if the processor determines that the outside temperature is a freezing temperature, issue the command.

14. The device of claim 1, wherein at least one of the vehicle control component or the vehicle control system includes at least one of a brake control and a steering control, and wherein the issued command changes a ratio of right to left automatic brake application.

15. The device of claim 1, wherein at least one of the vehicle control component or the vehicle control system includes at least one of a brake control and a steering control, and wherein the issued command changes a ratio of right to left automatic brake application, wherein the ratio of right to left automatic brake application is greater than one if a side of the vehicle on which the first vehicle tire in contact with the rumble strip is located is the right side, and wherein the ratio of right to left automatic brake application is lesser than one if the side of the first vehicle on which the first vehicle tire in contact with the rumble strip is located is the left side.

16. The device of claim 1, wherein the command reduces at least one of a gain of the vehicle control component or a gain of the vehicle control system.

17. The device of claim 16, wherein at least one of the vehicle control component or the vehicle control system includes at least one of a brake control and a steering control.

18. The device of claim 17, wherein the issued command changes a ratio of right to left automatic brake application.

19. The device of claim 17, wherein the issued command changes a ratio of right to left automatic brake application, wherein the ratio of right to left automatic brake application is greater than one if the side of the vehicle on which the first vehicle tire in continued contact with the rumble strip is located is the right side, and wherein the ratio of right to left automatic brake application is less than one if the side of the vehicle on which the first vehicle tire in continued contact with the rumble strip is located is the left side.

20. The device of claim 16, wherein the processor is further adapted to receive a second signal indicative of at least one of an outside temperature that is freezing and a value of an outside temperature, wherein the processor further includes logic to:
  analyze the second signal and determine whether the outside temperature is a freezing temperature; and
  only if the processor determines that the outside temperature is a freezing temperature, issue the command.

21. The device of claim 16, wherein the processor is further adapted to:
  receive a first input indicative of a side of the first vehicle on which the vehicle tire in contact with the rumble strip is located; and
  receive a second input indicative of a state of the vehicle with respect to vehicle road departure and direction of road departure;
  wherein the processor further includes logic to:
    determine whether the first vehicle tire is in continued contact with the rumble strip;
    determine whether the vehicle is in a state of continued road departure based on the second input; and
    only if the vehicle is in the state of continued road departure, and, with respect to a lateral direction of the vehicle, only if the direction of road departure is opposite the side of the vehicle on which the first vehicle tire in continued contact with the rumble strip is located, issue the command.

22. The device of claim 1, wherein the processor is adapted to receive an input indicative of a type of rumble strip in contact with the first vehicle tire, wherein the processor further includes logic to analyze the first signal and further issue the command based on the type of rumble strip in contact with the first vehicle tire, wherein the command activates at least one of the vehicle control component or the vehicle control system, and wherein the logic to analyze the first signal and issue the command based on the type of rumble strip in contact with the first vehicle tire includes logic to:
  determine that the input is indicative of a first type of rumble strip as opposed to at least a second type of rumble strip, and only if a determination is made that the input is indicative of the first type of rumble strip, issue the command.

23. The device of claim 1, or 11, or 16, wherein the processor is further adapted to receive a second signal indicative of at least one of an outside temperature that is freezing and a value of an outside temperature, wherein the processor further includes logic to:
  analyze the second signal and determine whether the outside temperature is a freezing temperature; and
  only if the processor determines that the outside temperature is a freezing temperature, issue the command.

24. The device of claim 1, or 11, or 16, wherein the processor is adapted to receive an input indicative of a type of rumble strip in contact with the first vehicle tire, and wherein the processor further includes logic to analyze the first signal and further issue the command based on the type of rumble strip in contact with the first vehicle tire.

25. The device of claim 1, or 5, or 11, or 14, or 16, or 18, wherein the processor is further adapted to:
  receive an input indicative of a state of the vehicle with respect to vehicle road departure;
  wherein the processor further includes logic to:
    determine whether the first vehicle tire is in continued contact with the rumble strip;
    determine whether the vehicle is in a state of continued road departure based on the input; and
    only if the first vehicle tire is in continued contact with the rumble strip and the vehicle is in the state of continued road departure, issue the command.

26. The device of claim 1, or 5, or 11, or 15, or 16, or 19, wherein the processor is further adapted to:
  receive a first input indicative of a side of the vehicle on which the first vehicle tire in contact with the rumble strip is located; and receive a second input indicative of a state of the vehicle with respect to vehicle road departure and direction of road departure;

wherein the processor further includes logic to:
determine whether the first vehicle tire is in a continued contact with the rumble strip;
determine whether the vehicle is in a state of continued road departure based on the second input; and
only if the vehicle is in the state of continued road departure, and, with respect to a lateral direction of the vehicle, only if the direction of road departure is opposite the side of the vehicle on which the first vehicle tire in continued contact with the rumble strip is located, issue the command.

27. A device adapted to automatically control the effective output of a vehicle control system/component in response to tire contact with a rumble strip, comprising:

a processor adapted to receive at least a first signal indicative of at least one of (i) contact of a first vehicle tire with a rumble strip and (ii) absence of contact of the first vehicle tire with a rumble strip, wherein the processor includes logic to:
determine that no vehicle tire is in contact with a rumble strip based at least on one of (i) the first signal and (ii) an absence of the first signal; and
only if the processor has determined that no vehicle tire is in contact with the rumble strip, issue a command to enable at least one of a vehicle control component or a vehicle control system.

28. The device of claim 27, wherein at least one of the vehicle control component or the vehicle control system includes at least one of a brake control and a steering control.

29. The device of claim 28, wherein the processor is further adapted to:
receive an input indicative of a state of the vehicle with respect to vehicle road departure;
wherein the processor further includes logic to:
determine whether the first vehicle tire is in continued contact with the rumble strip;
determine whether the vehicle is in a state of road departure recovery or continued road departure based on the second input; and
only if the first vehicle tire is not in continued contact with the rumble strip and the vehicle is in the state of continued road departure, issue the command;
wherein the issued command changes a ratio of right to left automatic brake application.

30. The device of claim 28, wherein the processor is further adapted to:
receive a first input indicative of a side of the vehicle on which the first vehicle tire in contact with the rumble strip is located; and
receive a second input indicative of a state of the vehicle with respect to vehicle road departure and direction of road departure;
wherein the processor further includes logic to:
determine whether the first vehicle tire is in continued contact with the rumble strip;
determine whether the vehicle is in a state of road departure recovery or continued road departure based on the second input; and
only if the vehicle is in the state of continued road departure, and, with respect to a lateral direction of the vehicle, only if the direction of road departure is the same as the side of the vehicle on which the first vehicle tire in continued contact with the rumble strip is located, issue the command;
wherein the issued command changes a ratio of right to left automatic brake application, wherein the ratio of right to left automatic brake application is greater than one if the side of the vehicle on which the first vehicle tire in continued contact with the rumble strip is located is the right side, and wherein the ratio of right to left automatic brake application is less than one if the side of the vehicle on which the first vehicle tire in continued contact with the rumble strip is located is the left side.

31. The device of claim 27, wherein the processor is further adapted to receive a second signal indicative of at least one of a freezing outside temperature and a value of an outside temperature, wherein the processor further includes logic to:
analyze the second signal and determine whether the outside temperature is a freezing temperature; and
only if the processor determines that the outside temperature is not a freezing temperature, issue the command, wherein the command activates at least one of the vehicle control component or the vehicle control system.

32. The device of claim 27, wherein the processor is further adapted to:
receive a second input indicative of a state of the vehicle with respect to vehicle road departure;
wherein the processor further includes logic to:
determine whether the first vehicle tire is in continued contact with the rumble strip;
determine whether the vehicle is in a state of continued road departure based on the second input; and
only if the first vehicle tire is not in continued contact with the rumble strip and the vehicle is in the state of continued road departure, issue the command.

33. The device of claim 27, wherein the processor is further adapted to:
receive a first input indicative of a side of the vehicle on which the first vehicle tire in contact with the rumble strip is located; and
receive a second input indicative of a state of the vehicle with respect to vehicle road departure and direction of road departure;
wherein the processor further includes logic to:
determine whether the first vehicle tire is in continued contact with the rumble strip;
determine whether the vehicle is in a state of continued road departure based on the second input; and
only if the vehicle is in the state of continued road departure, and, with respect to a lateral direction of the vehicle, only if the direction of road departure is the same as the
side of the vehicle on which the first vehicle tire in continued contact with the rumble strip is located, issue the command.

34. A program product for automatically controlling the effective output of a vehicle control system/component in response to tire contact with a rumble strip comprising machine-readable program code for causing, when executed, a machine to perform the following method:
determine that at least one vehicle tire is in contact with a rumble strip based at least on a first signal indicative of contact between a vehicle tire and a rumble strip; and
only if a processor has received the first signal and has determined that the at least one vehicle tire is in contact with the rumble strip, issue a command to control the effective output of at least one of a vehicle control component or a vehicle control system.

* * * * *